(12) United States Patent
Moriyasu (10) Patent No.: US 6,516,527 B1
(45) Date of Patent: Feb. 11, 2003

(54) INCLINOMETER

(76) Inventor: Hiro Moriyasu, 1314 SW. 57th Ave., Portland, OR (US) 97221

( * ) Notice: Subject to any disclaimer, the term of this patent is extended or adjusted under 35 U.S.C. 154(b) by 34 days.

(21) Appl. No.: 09/706,282

(22) Filed: Nov. 3, 2000

(51) Int. Cl.$^7$ ................................................ G01C 9/06
(52) U.S. Cl. ........................ 33/366.15; 33/366.11; 33/366.18; 33/366.22
(58) Field of Search ................... 33/366.11, 366.15, 33/366.18, 366.19, 366.21, 366.22, 366.25; 524/663, 660

(56) References Cited

U.S. PATENT DOCUMENTS

| | | | |
|---|---|---|---|
| 3,906,471 A | * 9/1975 | Shawhan ................ 33/366.11 |
| 4,167,818 A | 9/1979 | Cantarella et al. ............ 33/366 |
| 4,503,622 A | * 3/1985 | Swartz et al. ............ 33/366.14 |
| 4,521,973 A | * 6/1985 | Wiklund et al. ......... 33/366.19 |
| 4,528,760 A | 7/1985 | Plummer ................... 33/366 |
| 4,851,775 A | 7/1989 | Kim et al. .................. 324/247 |
| 4,912,662 A | 3/1990 | Butler et al. ............... 364/559 |
| 5,237,753 A | * 8/1993 | Carlson et al. ............ 22/366.14 |
| 5,459,676 A | 10/1995 | Livingston ................ 364/559 |
| 5,802,728 A | * 9/1998 | Karnick et al. ............ 33/366.14 |

* cited by examiner

*Primary Examiner*—Diego Gutierrez
*Assistant Examiner*—Travis Reis
(74) *Attorney, Agent, or Firm*—Dellett & Walters (57) ABSTRACT

A digital inclinometer detects an inclination angle by sensing varying conductive current of various electrodes. When the inclinometer is rotated through an inclination angle, various segments of the sensing electrodes become immersed in a conductive fluid causing varying conductive currents to these sensing electrodes. A driving signal is applied to driving of electrode and the sensing side of electrodes is kept at a constant voltage by connecting them to an analog ground or to current sensing amplifier which maintains virtual ground during measurement to achieve an equipotential at both sides of the sensor plates. An Analog to Digital converter, microprocessor, and LCD display achieves a digital readout. Novel methods allow 360-degree precise measurements, while overcoming traditional limitations and errors due to fringe effects, non-linearity, and various environmental changes.

8 Claims, 10 Drawing Sheets

INCLINOMETER

BACKGROUND OF THE INVENTION

This invention relates to inclinometers.

There are a number of inclinometers and level detectors disclosed in the prior art. Prior art devices were met with several limitations to obtaining accurate, and repeatable performance over 360 degrees of rotation, thus necessitating elaborate compensation to overcome non-linearity, and environmental variation for each device.

Prior art devices utilizing liquid electrolytes suffer non-linearity due to a fringe effect, limited angle of rotation, and temperature effects. Capacitive inclinometers utilizing liquids and dielectric media between driving and sensing electrodes suffer stray capacitive and non-linear capacitive variation, thus requiring table look up non-linearity compensation unique to each individual sensor. Matching sensors to inclinometer read-out units adds complexity to the manufacturing process and adds complexity for sensor interchangeability. Optical disks with pendulum often limit resolution due to a finite number of optical windows in the wheel and mechanical friction and wear associated with the shaft.

SUMMARY OF THE INVENTION

In accordance with the invention, an inclinometer is provided that includes a sealed enclosure cavity partially filled with a conductive liquid, a driver electrode placed concentrically within the cavity and plural sensing electrodes on a non-conductive structure placed concentrically within the cavity.

Accordingly, it is an object of the present invention to provide an improved inclinometer able to achieve a high resolution, precise, continuous 360-degree inclination angle measurement, overcoming the necessity for linearity correction, look-up table and correction for each individual inclinometer.

It is a further object of the present invention to provide an improved inclinometer that overcomes liquid electrolytic variance due to liquid fill level variation, liquid meniscus effect, concentration, temperature effects, and aging effects changing the conductivity of the liquid.

It is yet another object of the present invention to provide an improved inclinometer that allows true sensor interchangeability at the manufacturing stage, field, or customer options.

Yet a further objective of the invention is to achieve improved inclinometer sensors able to be miniaturized by scaling down without suffering non-linearity, environmental changes, and calibration or complex correction circuitry requirements.

Yet another objective of the invention is to achieve improved inclinometers with multiplexable multi-axis 3-D gravity sensing without requiring complex circuitry associated with each axis.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises an inclinometer.

Figure 1:
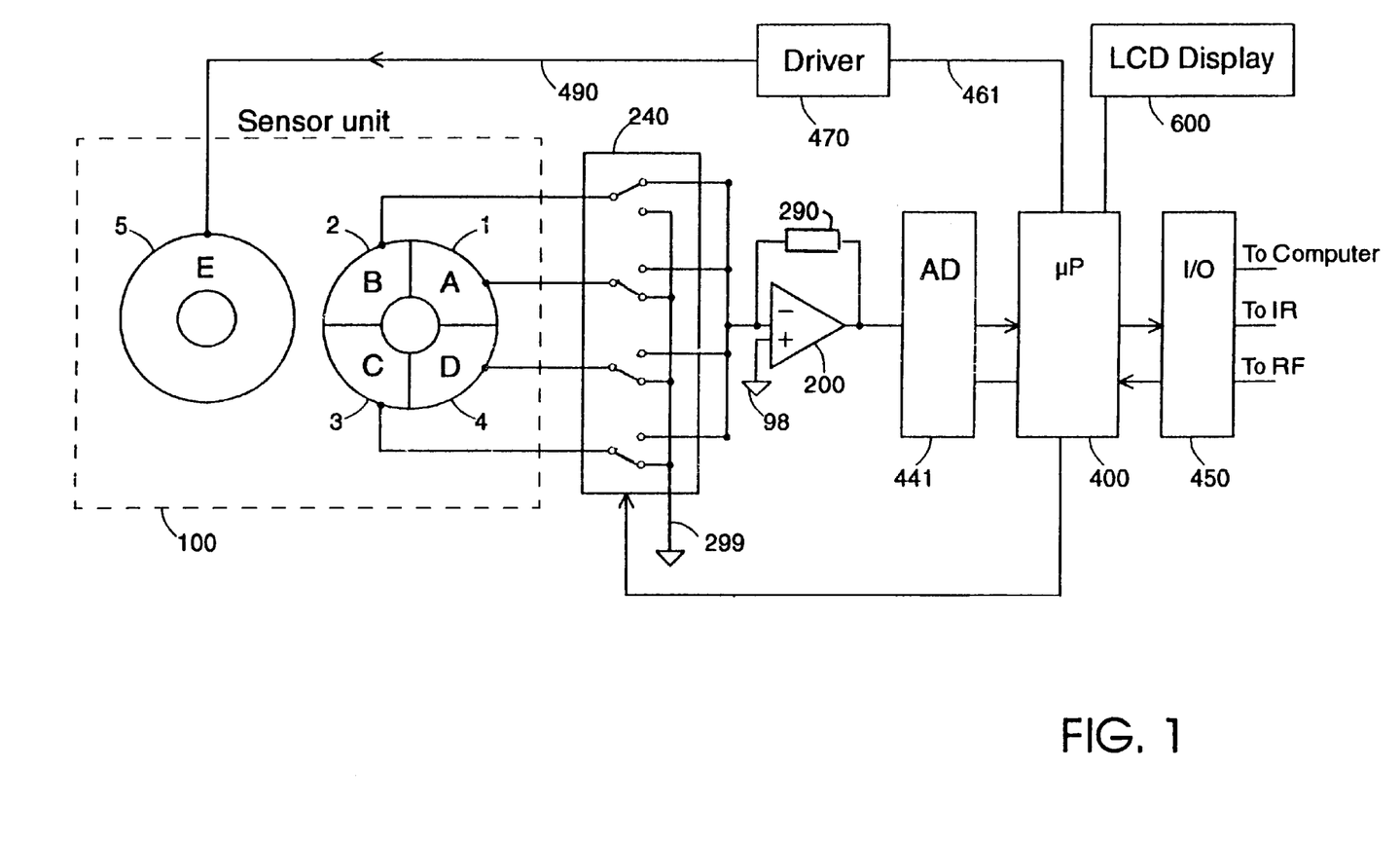
FIG. 1 is a block diagram of an embodiment of the invention.

FIG. 1 illustrates the preferred embodiment of the inclinometer, consisting of a liquid-filled sensor 100. Multiplexer 240 select the sensor segments A through D. Amplifier 200 converts current to voltage while maintaining a virtual ground. The analog to digital converter (AD) 441 converts voltage to a number. Microprocessor 400 supervises the process and does some of the calculations. LCD display 600 presents the measured angle to the user.

The sensor module 100 comprises a driver electrode plate 5, and sensing electrode plates 1, 2, 3, and 4. Sets of electrodes are facing each other and are separated by an insulating spacer that is filled by a conductive liquid. Typically, one half of the sensor cavity is filled with conductive liquid and the top half is filled with a nonconductive gas. For example, if the sensor is placed on a level surface, and driving signal is applied to the driver plate E5 current will flow to the plate C3 and D4. Microprocessor 400 generates alternating signal 461 through signal driver 470 to the driving electrode E5. Alternating pulses are used to avoid electrolytic polarization effects.

The selected segment's current is converted to a voltage by the virtual ground current-sense amplifier 200. The voltage is then connected to the A-to-D converter 441. Microprocessor 400 uses the resulting value to perform calculations and provide an actual angle of rotation.

For example, if 100 units of current are applied to the driver plate E5, 50 units of the current are detected by the electrode C3 and 50 units of current are detected by the electrode D4.

To read the current at each electrode, the multiplexer 240 will connect the selected electrode to the virtual ground current sensing amplifier 200 and unselected electrodes to the analog ground at 299.

It is known that when two electrodes are facing each other and all of the current field patterns are kept perpendicular to the plates, the current is proportional to the area of plates.

The circular geometry design of the sensing electrode plate is kept concentric, the current in each segment will change, when the sensor is rotated, proportionally to the area submerged, provided current is monitored without changing voltage while measurements are made.

Figure 1A:
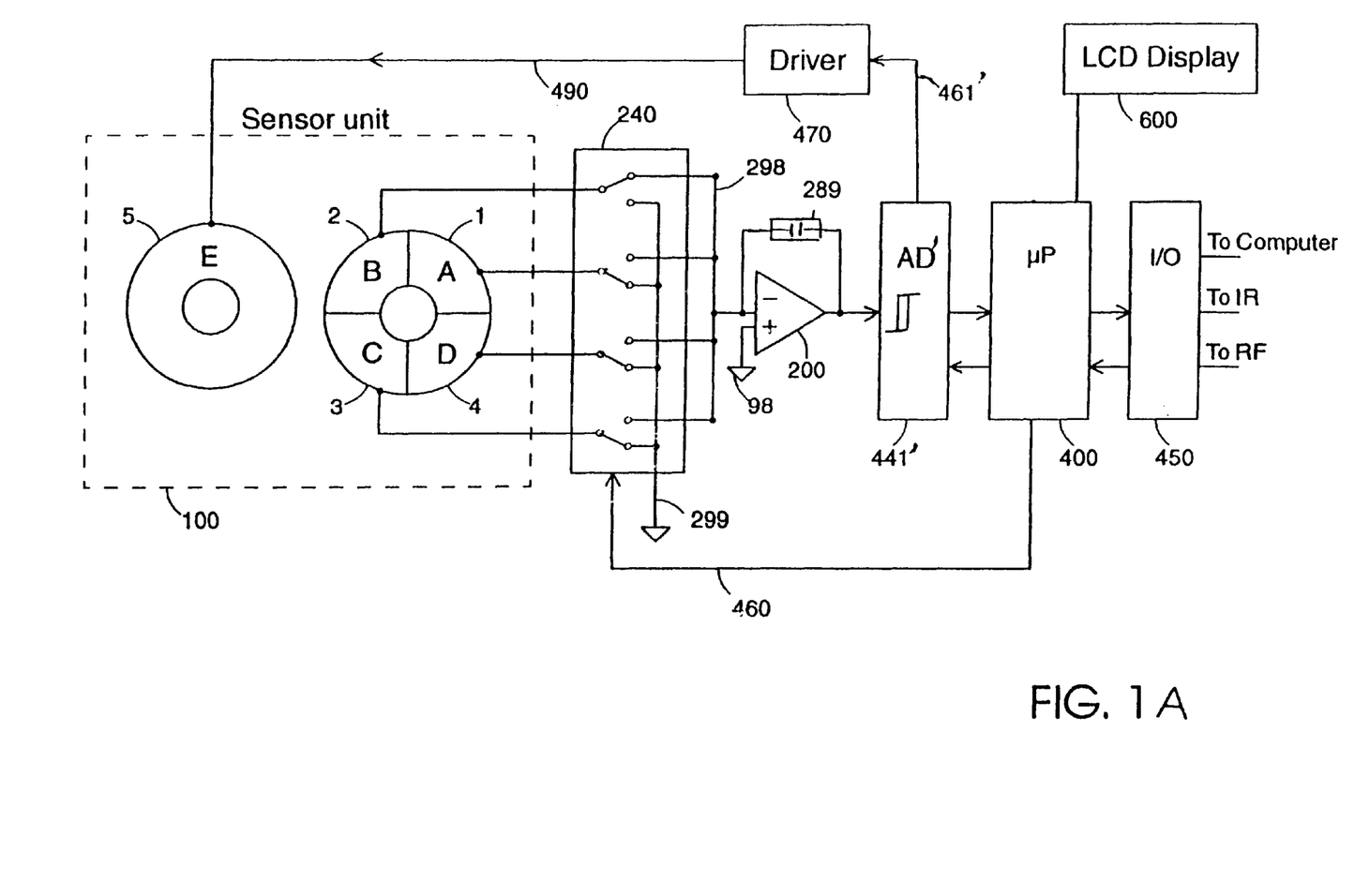
FIG. 1A is a block diagram of an alternate embodiment of the invention.

It will be appreciated by those skilled in the art that utilizing a virtual ground feedback amplifier offers enormous advantage in achieving flexibility and predictable performance. The current sense amplifier characteristics are defined by the feedback component 290. For example, if a resistive component is selected for 290, the output of the sense amplifier results in voltage. In this case, the output voltage sense amplifier 200 equals sense current times feedback resister. Alternatively, if a capacitor 289 is selected for the feedback component, the sensed current integrates current and results in a ramp voltage at the output of the sense amplifier. For integrator mode, AD 441 may be substituted by a voltage threshold device 441' as shown in FIG. 1A, such as a voltage level comparator or Schmitt gate. If frequency count is desired, an analog threshold detector employed as detector 441' will cause a polarity flip of driver signal 490 in an opposite direction such that current flow through sensor results in the integrator reversing direction until analog level threshold detector 441' detects and reverses drive output polarity again, thus forming a relaxation oscillator.

Operating in precision frequency or timer mode, using a capacitive feedback integrator, various well-known techniques are available, to convert current to numerical values, such as counting the number of output pulses or timing with a microprocessor's timer mode. Therefore sensed current from the electrode plate may be converted to voltage, time or frequency without affecting the precise current sensing. Using a virtual ground feedback amplifier-summing mode as a current sensor to maintain a negligible voltage range with respect to all other sensed plates provides precise and predictable measurements and offers consistent mathematical calculations by microprocessor.

Microprocessor 400 provides the driving signal 461 through drive conditioner 470, which may be straight through or through a current limiting resistor, to provide proper current to the driving plate.

Although analog to digital conversion is illustrated by an A to D device, it is understood various alternative means to convert analog current to frequency or time period and detecting and converting to digital quantities is covered by this invention.

Although the sensor is shown with four segments, any number of sensing electrodes may be used. A minimum of two sensing sectors are required for limited angle coverage and a minimum of three sensing sector are needed for complete 360° coverage.

Two inclinometers can be connected and communicate with each other to perform a differential measurement. The resulting data is displayed by the LCD display 600. The microprocessor also performs an I/O function 450 to external equipment (such as a computer) via direct wire, wireless IR link, or RF transmitter.

Figure 2:
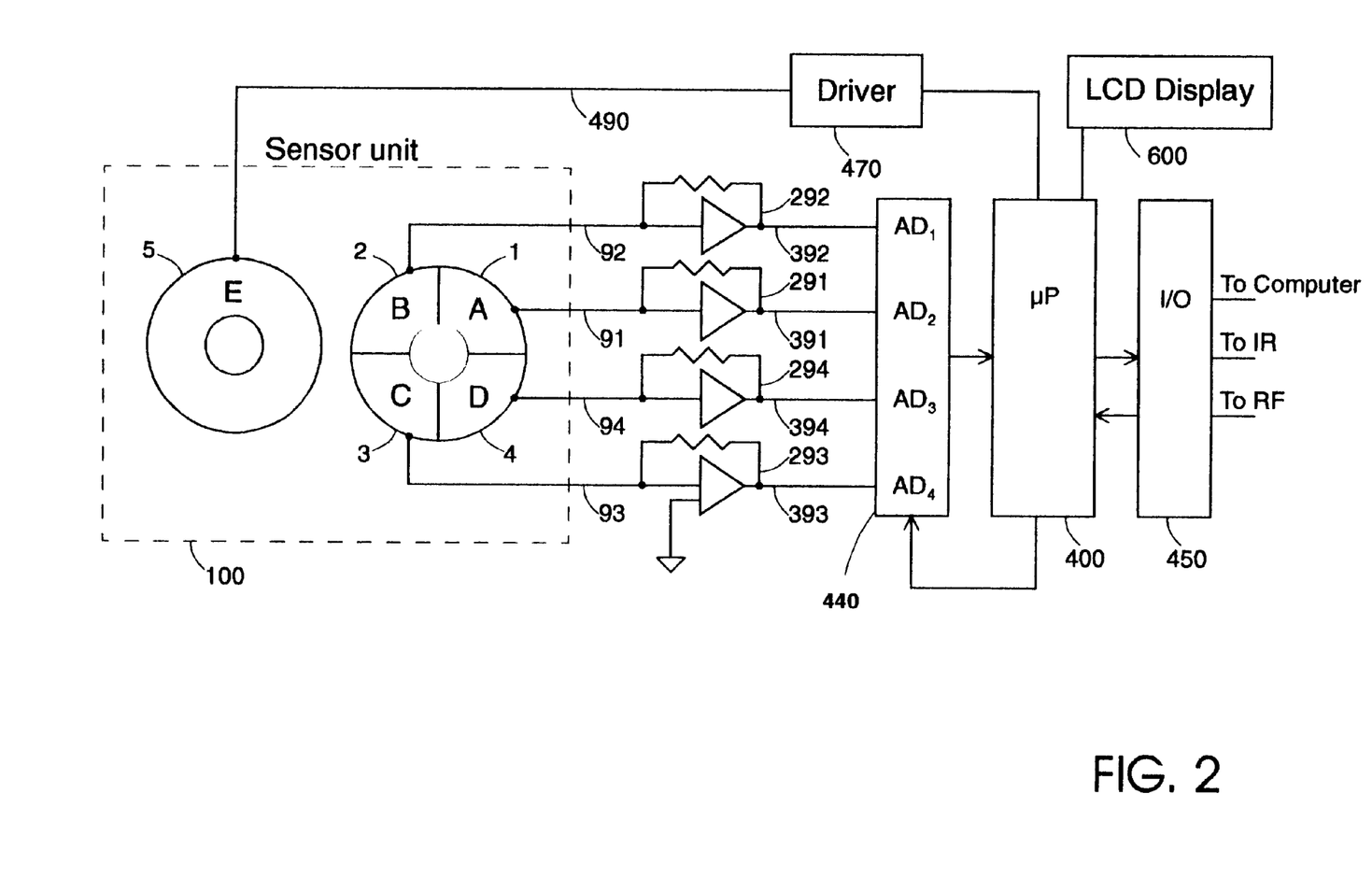
FIG. 2 is a block diagram of another embodiment utilizing parallel current sensing.

FIG. 2 illustrates simultaneous current sensing by four virtual ground current sensing amplifiers. Segment currents, 91, 92, 93, and 94 are converted to voltages at the outputs of the amplifiers 291, 292, 293 and 294 resulting in voltages 391, 392, 393, and 394.

Analog to digital converter 440 takes readings to be calculated by the microprocessor. The LCD display unit 600 displays the result.

Although FIG. 2 is illustrated with the microprocessor as a computational means, it is evident to those who have skill in the art, that the calculations can be performed by analog operational-like amplifier means. In such applications, the analog signals 391, 392, 393, and 394 (which represent segment currents A, B, C, and D) would be scaled and shifted to create analog voltages representing the angle of rotation.

Figure 3A:
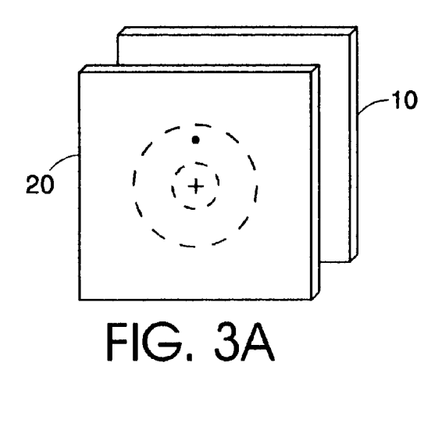
FIGS. 3A through 3G are sketches of the sensor showing the assembly of the sensor unit and its components.

A sensor according to the invention will be discussed in connection with FIG. 3A through FIG. 3G, which represent an example of a liquid filled rotational sensor. FIG. 3A shows the driver side of the electrode plate 20 and the sensor plate 10 with a spacer ring 30 as shown in FIG. 3C. Plate 20 and plate 10 may be constructed of any substrate material, such as glass filled epoxy boards, glass, or ceramic, that allows metalization of segmented circular patterns.

Figure 3B:
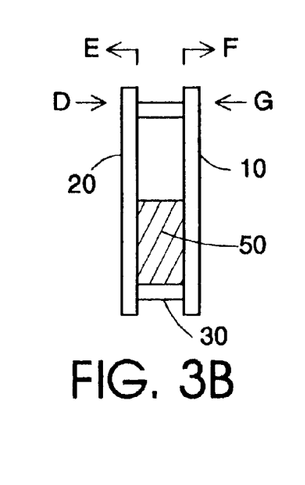
Figure 3C:
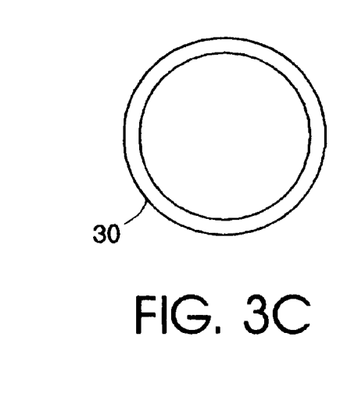
Figure 3D:
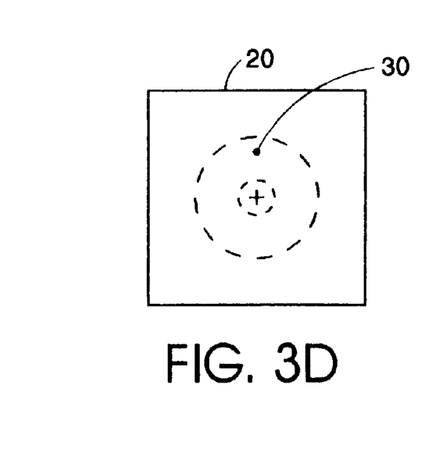
Figure 3E:
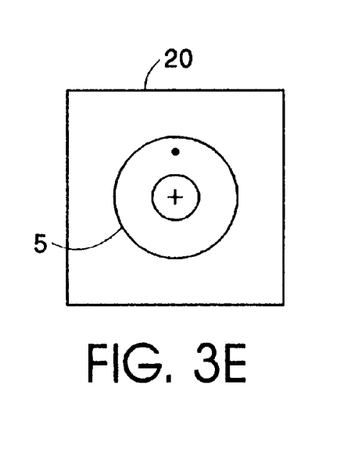
Figure 3F:
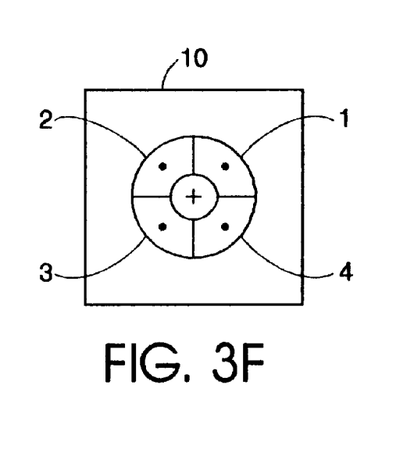
Figure 3G:
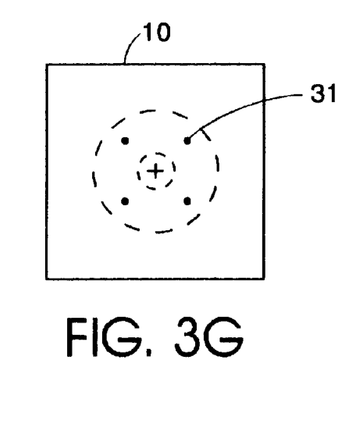

The cross section view of the sensor is shown in FIG. 3B. A conductive liquid 50 is encased by the two plates 20 and 10 and the spacer ring 30. Half of the cavity is filled with conductive liquid. The two plates 10 and 20 in FIG. 3B are further illustrated from viewpoint to D, E, F, and G in FIG. 3D through FIG. 3G. FIG. 3E shows the driver electrode 5 facing sensor electrodes 1, 2, 3, and 4 in FIG. 3F. Electrical connection to the outside of the cavity may be made by a VIA 30 of FIG. 3D and VIA 31 of FIG. 3G.

It is also understood that a connection can be made by a trace running radially outwardly under the spacer ring 30. The actual manner used is not critical as long as it does not disturb the current field's symmetry. It is also evident that the driver side plate may alternately be made of solid metal, possibly being combined with spacer ring 30 as a metal can. The primary consideration of the driver is to produce a geometrically concentric current field.

Figure 4A:
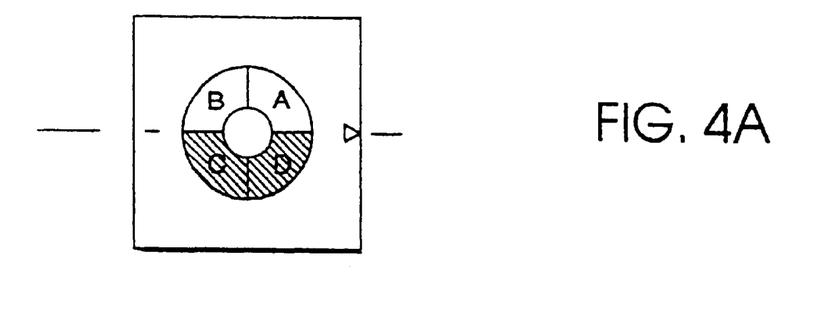
FIGS. 4A through 4D shows various portions of electrodes-that are immersed as the sensor is rotated.
Figure 4B:
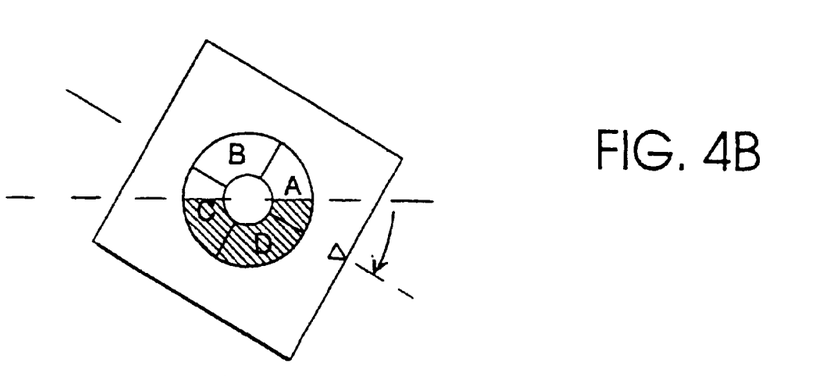

The steps performed in sensing are now discussed in conjunction with FIGS. 4A through 4D, which illustrate the process of detecting rotational angle by sensing currents received by the sensing electrodes. Initially the sensor is placed at a level position, and half of the plates of the sensor are submerged as shown in FIG. 4A. When the sensor unit is rotated, the conductive region changes resulting in an increase of current by plate A and a corresponding decrease in plate C as shown in FIG. 4B.

To illustrate the angle conversion from the area current reading, let us assume 100 units of current is applied from the driving plate. At level, sensor C and D each get 50 units, as graphically shown in FIG. 4A. In order to determine the orientation of the sensor, the values of the sensor plates A, B, C, and D will be taken. By determining which sector has the highest reading, then sensor orientation can be determined.

After the dominant quadrant is determined, a dual-pair calculation is preformed by comparing a left side set of two sensor plates verses a right side set of two sensor plates. The algorithm entails of subtracting the right side sensor set (A+D) reading from the left side sensor set (B+C) reading.

FIG. 4B illustrates a change in the conductive region of the sensor plates when the sensor module is rotated clockwise. The conductive region is exposed to electrode A while exposure of C is reduced. Correspondingly, current flow to A increases and current to C decreases. The changes are in equal amounts as shown graphically.

To compute the angle of rotation from electrical currents from a set of plates, a dual-pair difference calculation between the right side pair of electrodes A and D and the left side electrodes B and C is performed $$((B+C)-(A+D)). \tag{1}$$

Normalization is performed by dividing the difference of currents by the total current (A+B+C+D). This is a ratio and is converted to an equivalent angle by multiplying by 90°. The final angle is determined based on the dominant quadrant with an addition of 0, 90, 180, or 270.

$$90°*[(A+D)-(B+C)]/(A+B+C+D) \quad (2)$$

For example, the sensor is rotated 30 degrees and a total current of 100 units is applied to the driving plates. The resulting currents to the sensing plates will be:

A=16.67
B=0
C=33.33
D=50

The angle of rotation may be calculated:

$$90°*[(16.66+50)-(0+33.33)]/(16.66+0+33.33+50) \quad (3)$$

$$=90°*(33.33/100)=30 \text{ Degrees} \quad (4)$$

Figure 4C:
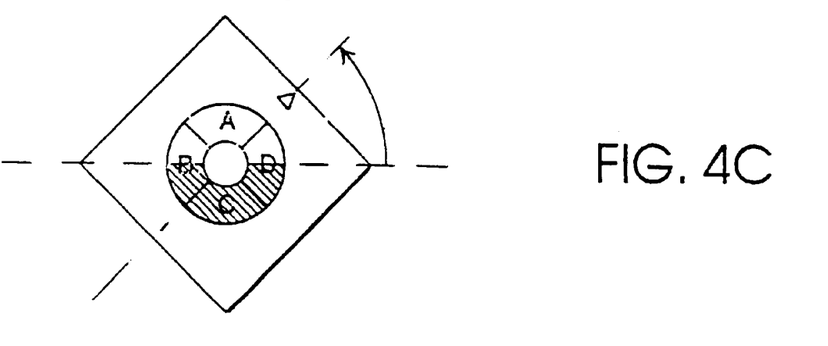

FIG. 4C illustrates the situation where the sensor is rotated in the opposite direction. Segment B has increased conduction and segment D has decreased an equal amount. Using the same equation as before, but with different set of sensed currents:

A=0
B=16.67
C=50
D=33.33

$$90°*[(0+33.33)-(16.67+50)]/(16.67+50+33.33) \quad (5)$$

$$90°*(-33.33/100)=-30° \quad (6)$$

The above illustration is made for a sensor that is operating near an upright position. Other quadrant zone calculation is essentially equivalent by adding or subtracting a fixed offset of 90 or 180 degrees to the basic difference calculation.

The stated calculation is appropriate within plus/minus 45° of 0°. It is also good within 45° of 180°. When it is within 45° of ±90°, a more accurate value can be computed by using a another difference calculation. Pairing (A and B) versus (C and D) yields:

$$90°*[(A+B)-(C+D)]/(A+B+C+D) \quad (7)$$

Instead of switching at 45° points from one zone to the other zone calculations, smooth weighed transition is performed by the microprocessor.

Figure 4D:
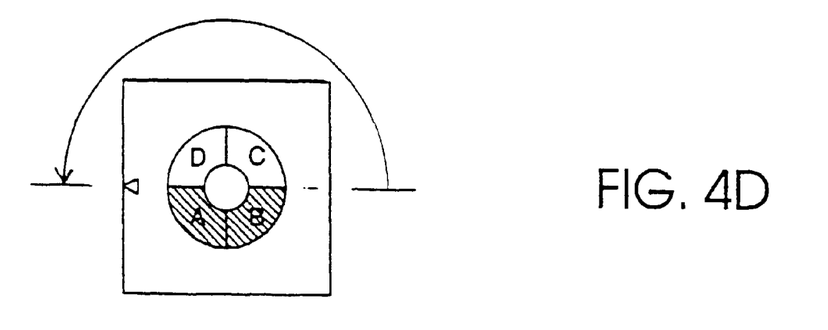

FIG. 4D shows sensor rotated 180°, thus submerging segments A and B and causing no conduction to segments C and D. To determine which quadrant the sensor is positioned to, the microprocessor determines the dominant conducting sector of the sensing plates. It then adds or subtracts multiples of 90°.

It is important to point out that the dual-pair difference calculations result in four null positions. These occur at level (0°), ±90°, -90° and the upside down position (180°). The signal null occurs when the left and right side conductive areas are equal. Provided that the sensor is centrically symmetrical, gravity will hold a true balance regardless of all other variances such as temperature, liquid level, and conductivity of conductive liquid.

It is also very noteworthy to point out additional diagonal-pair difference calculations can be performed near the 45° diagonal positions. Refer back to FIG. 4C, which illustrates a diagonal-pair difference calculation method. The left side plate A and right side plate C are diagonally opposite to each other and an equal area is submerged. Diagonal difference calculation yields null at rotations of ±45°, -45°, ±135°, and -135°. A combination of the two methods yields a total of eight positions that will exactly null, controlled by preciseness of plate geometry and gravity and unaffected by all other variables. This is another key advantage of the method according to this invention:

$$90°*(A-C)/(A+B+C+D)+45° \quad (8)$$

The angle computation, for example, with reference to FIG. 4B, will be determined by the geometry calculation:

$$90°*(A-C)/(A+B+C+D)+45° \quad (9)$$

By combining the dual-pair and the diagonal-pair based angle calculations, a total of eight positions achieve an exact null.

For ease of illustration the initial sensor orientation of sector gaps are right angles to the gravity. It is evident that the alternate diagonal pairs may be chosen as a starting position to indicate the gravity zero.

It is known that liquid exhibits various meniscus effects at the top surface where it interfaces to the non-conductive gas. This will cause undesirable fringe non-linearity effect. To overcome this undesirable effect difference calculation is utilized to cancel the effect of fringe effect, calculating pair of sensors readings and by subtracting the left side from the right side, as any effect such as meniscus effect or liquid level variation appears equally on both sides.

Figure 6A:
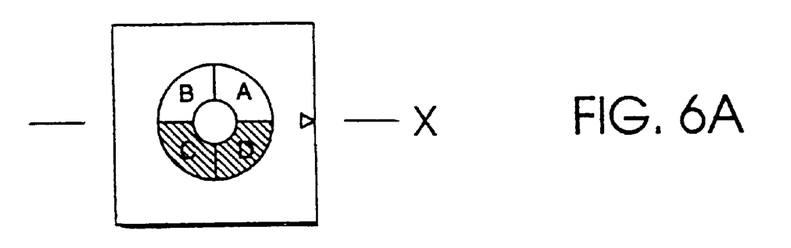
FIGS. 6A through 6D illustrate graphically sensor electrodes affected by liquid fill level.

In a sensor employing fluid, fluid level issues arise. To illustrate cancellation of fringe effect or liquid level change effect, refer to FIG. 6A through FIG. 6F. FIG. 6A shows a sensor placed at level with liquid level of 50% or ideal.

$$\text{Angle}=90°*(A+D)-(B+C))/(A+B+C+D) \quad (10)$$

Figure 6B:
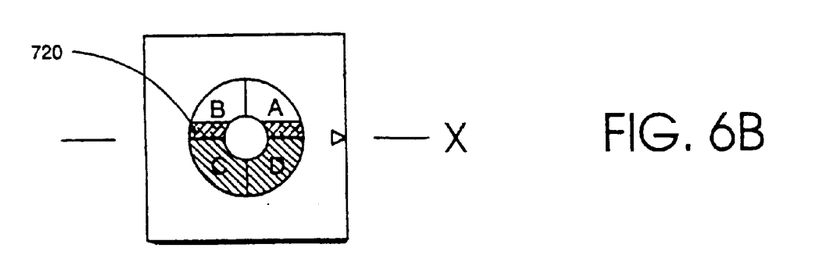

FIG. 6B shows a sensor that has been over filled, to illustrate the effect. The basic calculation with correct level should yield an angle=0°. To illustrate cancellation of overfilled liquid level, delta terms are added to electrode A and B.

$$\text{Angle}=90°*[(A+\text{delta}+D)-(B+\text{delta}+C)]/(A+B+C+D) \quad (11)$$

By subtraction the delta term cancels out resulting in:

$$\text{Angle}=90°*((A+D)-(B+C))/(A+B+C+D) \quad (12)$$

Using a difference calculation, liquid level variation will be cancelled.

Figure 6C:
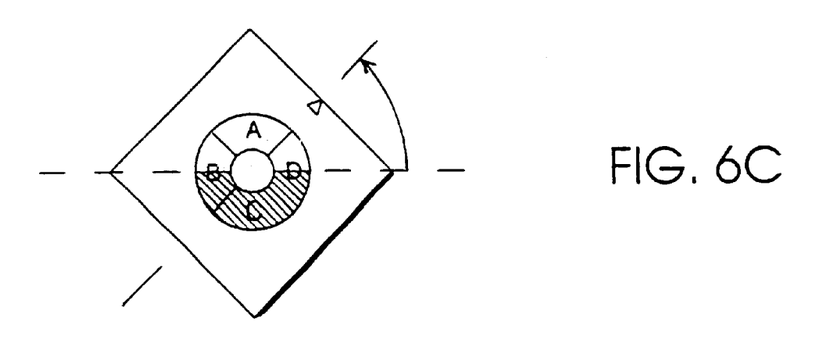

FIG. 6C illustrates the sensor rotated to new angle with correct liquid level:

$$\text{Angle}=90°*((A+D)-(B+C))/(A+B+C+D) \quad (13)$$

Figure 6D:
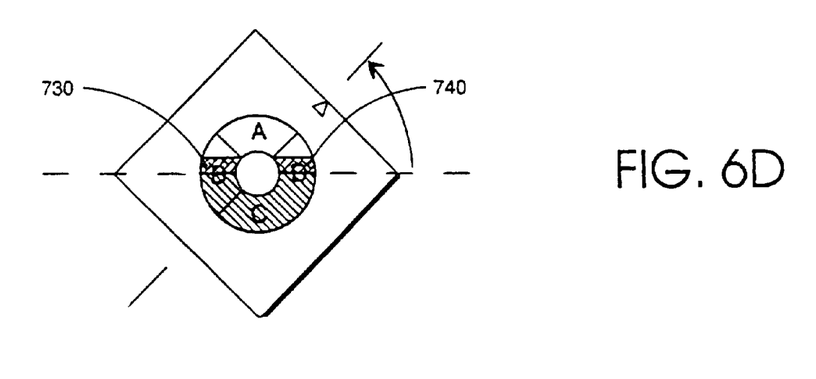

FIG. 6D shows the effect of the overfilled liquid level delta 730 and 740 added in both sides of electrode-to-electrode A and C.

Overfilled angle:

$$90°*((A+\text{delta}+D)-(B+C+\text{delta}))/(A+B+C+D+2\text{ delta}) \quad (14)$$

$$\text{Angle}=90°*((A+D)-(B+C))/(A+B+C+D+2\text{ delta}) \quad (15)$$

As it is seen, the delta effect is eliminated in the numerator but the denominator still has 2 delta. To eliminate 2 delta from denominator, the A+B+C+D term is replaced by 2Q, where Q is the fully submerged sector. Q can be determined by taking the largest value of A, B, C, or D. In this illustration in FIG. 6D sensor plate C is fully submerged and has largest reading. By selecting fully submerged sector Q, which does not have delta terms. The new expression will be:

$$\text{Angle}=90°*[(A+\text{delta}+D)-(B+\text{delta}+C)]/2Q \quad (16)$$

where Q equals to fully submerged sensor. This reduces to:

$$\text{Angle}=90°*[(A+D)-(B+C)]/2Q \quad (17)$$

since Q reads only fully submerged sector and does not contain delta which represents overfill or surface fringe effect. This expression illustrates variance term delta is completely removed from both numerator and denominator, thus overcoming error introduced by surface fringe effect and liquid level variation. This allows for the first time to determine angle of rotation based on geometry and gravity. This greatly adds flexibility in sensor design, such as scaling sizes, selection of liquid meniscus characteristics, and temperature effects on conductivity and volume.

Figure 5A:
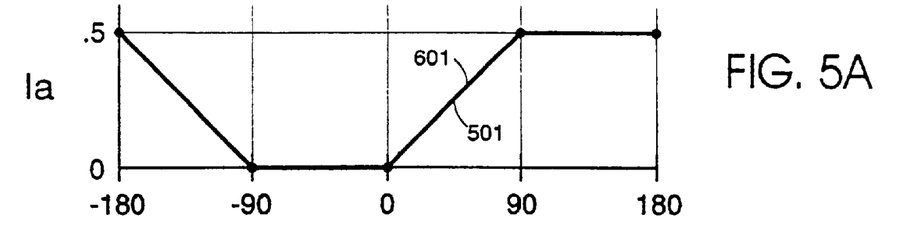
FIGS. 5A through 5E show graphically the current sensed by various electrodes when the inclinometer is rotated through the inclination angle.

To examine current responses now refer to FIGS. 5A through 5E. FIG. 5A through FIG. 5E show the normalized current of the various plates when the sensor unit is rotated between plus and minus 180°. FIG. 5A represents normalized current of sensor electrode A producing normalized current Ia. At level or zero degree rotation, the current of sensor A starts at zero and linearly increases to 0.5 units at 90° and retains 0.5 normalized current through 180°. By reversing rotation from the level position, current Ia remains zero through minus 90° and linearly increases to 0.5 normalized current at minus 180°of rotation.

Figure 5B:
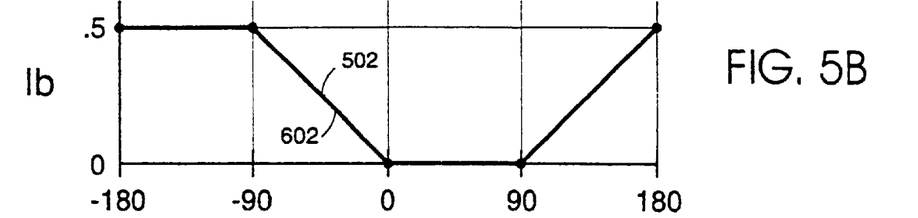
Figure 5C:
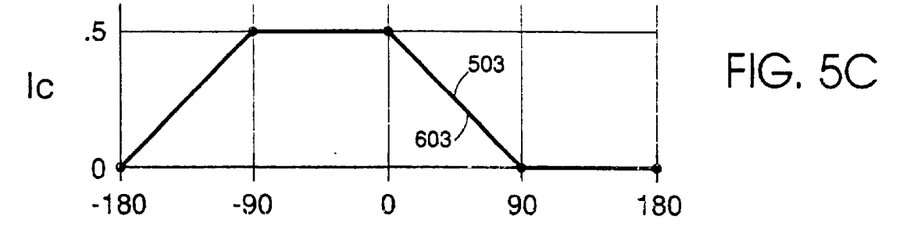
Figure 5D:
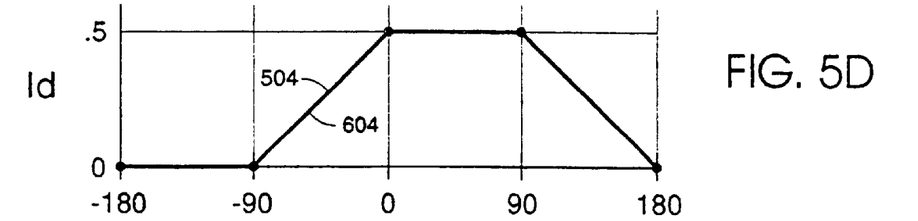
Figure 5E:
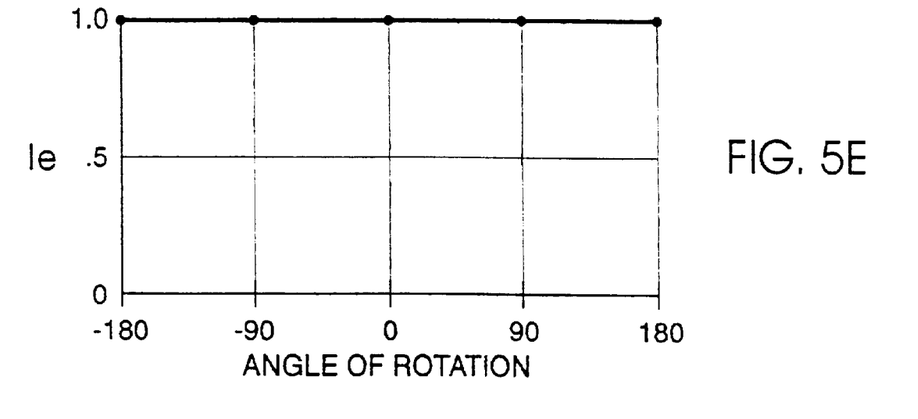

Likewise, FIG. 5B through FIG. 5D show sensor segments B, C and D responding to the rotation of the sensor unit as the liquid submerges different segments of the sensing plates.

The theoretical normalized current of sector A based on the geometry is graphically shown at 501 as sensor 10 is rotated. Actual normalized sector A current 601 is also shown graphically in FIG. 5A. The theoretical normalized current 501 and actual current 601 are graphically illustrated indicating a good correlation between them. Comparison of actual data of normalized sectors A, B, C, and D currents are shown as 501, 502, 503 and 504 in FIG. 5A through 5E. Theoretical normalized sector currents of A, B, C, and D are shown as 601, 602, 603, and 604.

The discontinuity at the gap between segments may be minimized by making the gap area small compared to the area of conductive area of electrodes. Cross currents between adjacent sensing segments is minimized by keeping all sensing plates at same potential by using a virtual ground current amplifier. Metalization and photo etching processes utilized in the semiconductor industry allows a micron resolution of edge etching thus achieving a high-resolution linear and scalable sensor, although it does not exclude use of linearity correction means but it does not mandate necessitating non-linearity correction. In prior art, liquid filled sensors such as capacitive sensors or voltage gradient level sensors suffered from non-linearity due to stray or fringe capacitive effects. Capacitive sensors based on prior art require non-linearity correction tables stored for each unit. This limits sensor or microprocessor interchangeability and thus creates manufacturing complexity by requiring matching sensors and uniquely programmed microprocessors.

Figure 7:
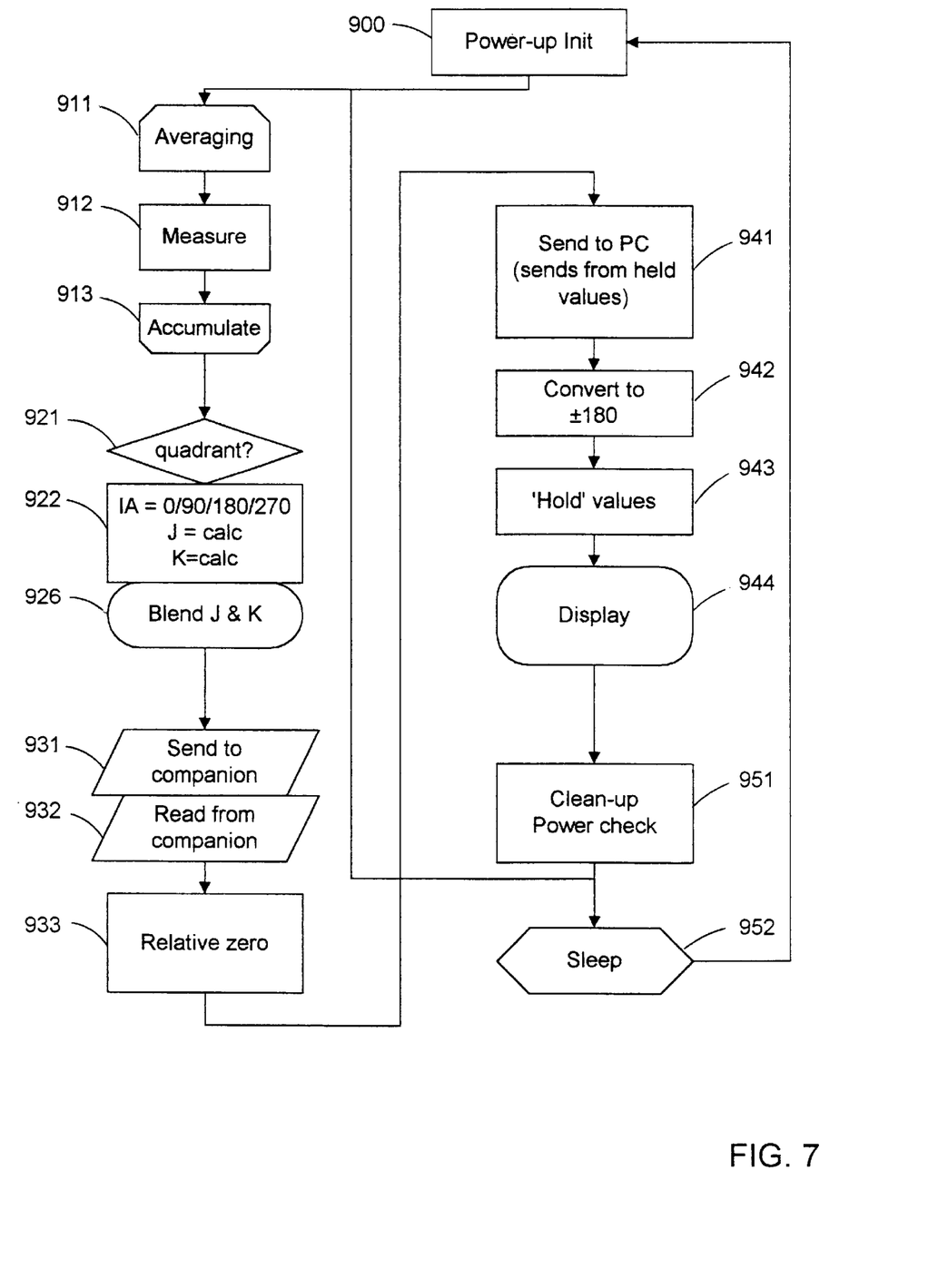
FIG. 7 shows a flow chart of the liquid inclinometer angle calculation.

FIG. 7 shows the basic flowchart of the microprocessor's program according to an embodiment of the invention. Strictly speaking, blocks 911, 912, 913, 921, 922 and 926 are the parts that deal with measuring an angle. Blocks 931, 932, 933, 941, 942, 943 and 944 are concerned with presentation issues. Block 900 and blocks 951 and 952 deal with power-up and shutdown issues.

Block 900 is a standard initialization section that zeroes all variables and applies power to any peripherals used at all times. Blocks 951 and 952 handle timeout and shutdown.

Block 911 sets up for multiple measurements to allow full use of the microprocessor's number range. It also configures the analog-to-digital converter, AD, for segment measurements. Block 913 adds the values measured by block 912 into larger variables. (This could be done during block 912 measurements, but having the last measurement set around for display in a debug mode is useful.)

Block 912 performs the actual measurements. For each measurement desired, it (1) selects the multiplex channel(s), (2) selects the proper stimulus, (3) pauses to allow the analog circuitry to stabilize, (4) triggers the ADC measurement, (5) waits for the measurement to complete, and (6) reads the value from the ADC and stores it. Normally, measurements are taken twice with positive and negative stimulus and then subtracted to cancel out certain DC offsets and prevent degradation of the sensor. For example, measurements can be taken for each segment. Since the multiplex has individual control over each channel, it is also possible to select segments in pairs, or do both.

Block 921 examines the raw input values to determine a very coarse angle—typically dividing into 1 time numbers of electrode segments or 2 times number of segments zones. The raw values from the measurements are used to build difference values and also determine the 'base' angle. Based on the zone, the differences (A+B) (C+D) and (A+D) (B+C) are placed in variables J and K. For example, a four segments sensor would yield a quadrant (zone) and the base angle would be one of 0, 90, 180, and 270.

J and K are still in raw AD units. So block 926 first calculates a full segment value (A+B+C+D) (or 2Q) and divides this into J and K. This converts them into ratios and drops out the physical current value. It then 'blends' J and K to yield the final angle within the segment using internal information about their respective accuracies. This information can include symmetry and the values of J and K to determine possible equations to use.

Although for simplicity of illustration double paired difference calculation is explained, diagonal paired calculation consists of $$(A-D)/A+B+C+D \quad (18)$$

calculation with constant offset value of 45 degrees is added to yield even higher resolution of calculation.

Finally, step 926 multiples by the angle units per segment, rounds, and adds the base angle. This results in an actual 'sensor' angle value in usable units.

Step 931 transmits this angle value to a possible 'companion' unit and step 932 receives a value from such. Step 933 then subtracts the two values and also adjusts for any 'stored zero'.

Step 941 checks a button and transmits all held values in computer format. (This section can be anywhere in the flowchart.) Step 942 converts the internally convenient angle range to a human convenient value—usually ±185° (assuming 5° hysteresis). Step 943 checks a button and logs (or 'holds') a value. Step 944 displays the value. (In any embodiment, there can be some additional display modes for reviewing held values, etc., that are incidental to the basic angle reading.)

Figure 8:
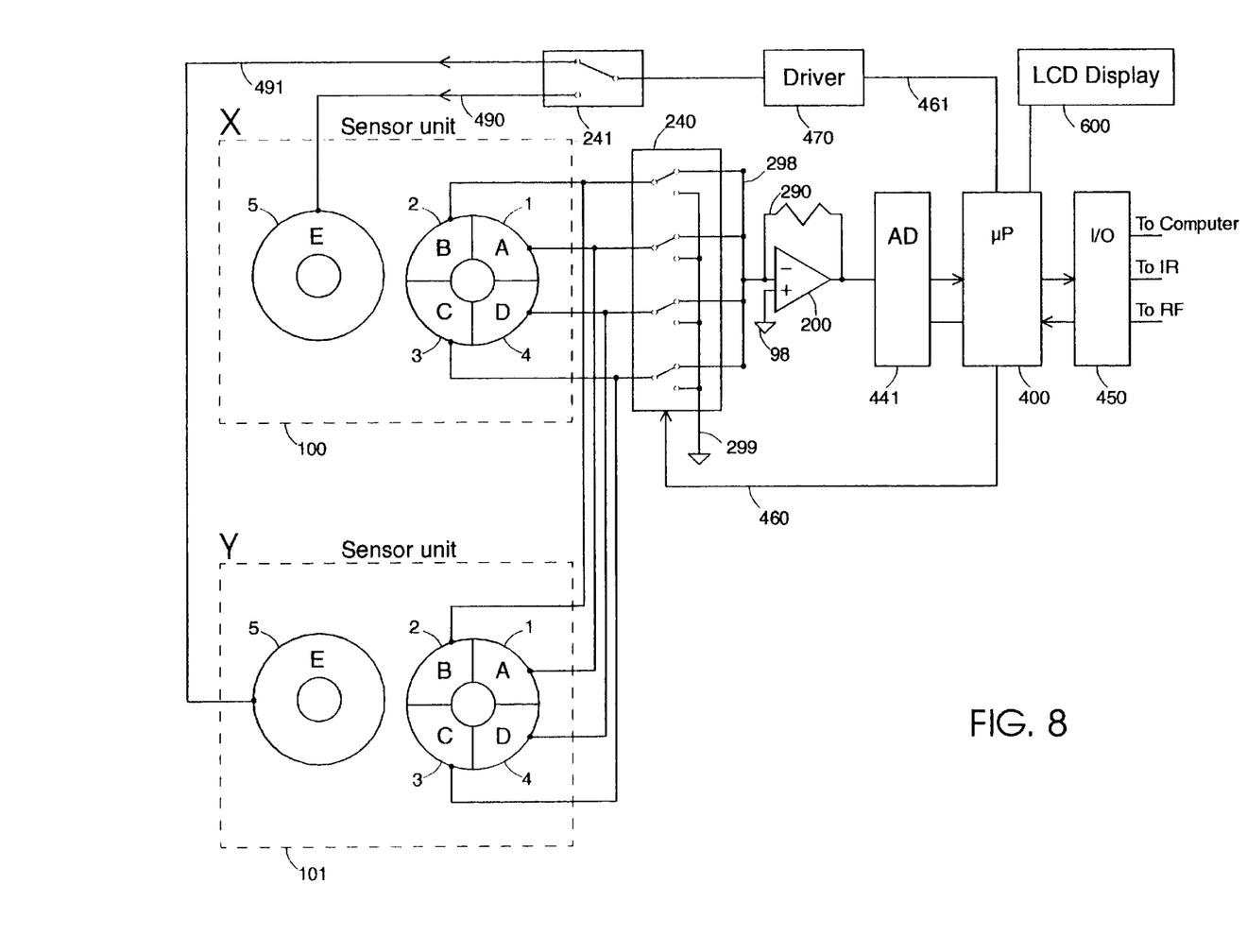
FIG. 8 shows multiplexing two sensors to read two sensors to perform X-axis and Y-axis movement measurement, or the differential angle measurement of joints.

A dual sensor design may be employed in accordance with the invention, wherein FIG. 8 illustrates an example of how sensor modules 100 and 101 can be multiplexed. A typical application requiring detection of multiple axis such as X and Y axis of head movements of the human body or robotic movements requiring remote sensing may be accomplished by multiplexing the drive line or sensing side or both.

In such applications, two sensors may be packaged in one box. Clearly, 3 sensors may be packaged in direction of x, y, z in one box to detect three axes with respect to gravity.

In another application using a second remote sensor is added to detect effective joint angle of two moving parts. In such application reading of angle from a master unit and subtracting the reading of companion units will yield true joint angle measurement. A key benefit of an inclinometer described according to the present invention is to allow greater flexibility to scale to smaller size without increasing complexity of keeping track of non-linearity and calibration for each sensor. High-resolution simple and true sensor interchangeability without recalibration may be obtained. For remote sensor applications, a liquid conductive sensor is the preferred embodiment, as a capacitive sensor is more susceptible to stray capacitor and noise.

Figure 9A:
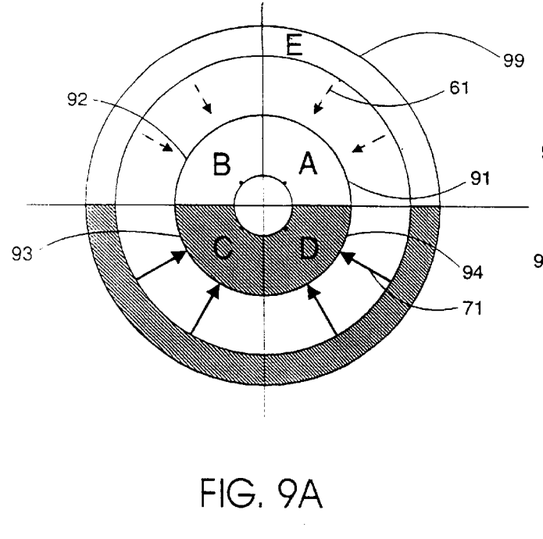
FIGS. 9A through 9D show introduction of a guard ring surrounding sensing electrodes.

An alternative sensor design includes a guard ring, wherein FIG. 9A through FIG. 9D illustrates a sensor design consisting of driver ring and sensing electrode plate in a same side of an enclosed container. Referring to FIG. 9A, driving signal is applied to the outer ring 99 and sensing plates A, B, C, D, 91, 92, 93, and 94 are placed on the inner side thereof. If conductive liquid is filled in the bottom half, current will flow into sensing plate C 93 and D 94 if the sensor is rotated different current will be detected in a similar manner described previously in the FIG. 4A through FIG. 4F.

Figure 9B:
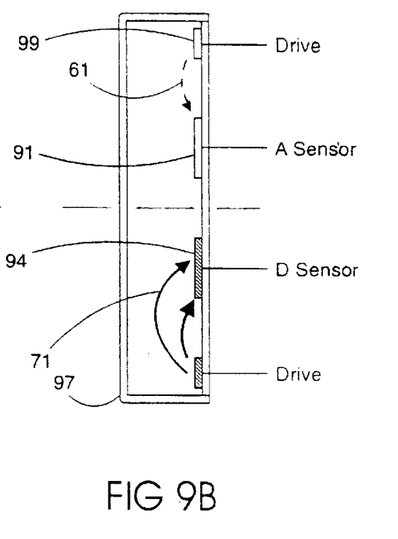

FIG. 9B shows cross section of sensor assembly encapsulated with a cap-like enclosure 97.

Referring back to FIG. 9A and 9B conductive liquid provides current between driving outer ring to inner sensing plates C 93 and D 94. In a steady state at upright position, sensing plate A 91 and plate B 92 are above the liquid, therefore no current will flow between driver plate 99 to sensing plate A 91 and plate B 92. However, if the sensor is rotated to submerge section A then return to upright position, liquid drains down surface between outer ring to inner sensing plate A 91 causing undesirable leakage current 61. Although wetting of the upper side of the sensor will eventually drain, a small amount of leakage current can remain due to moisture within encapsulated container. This effect will create limitation to miniaturization.

Figure 9C:
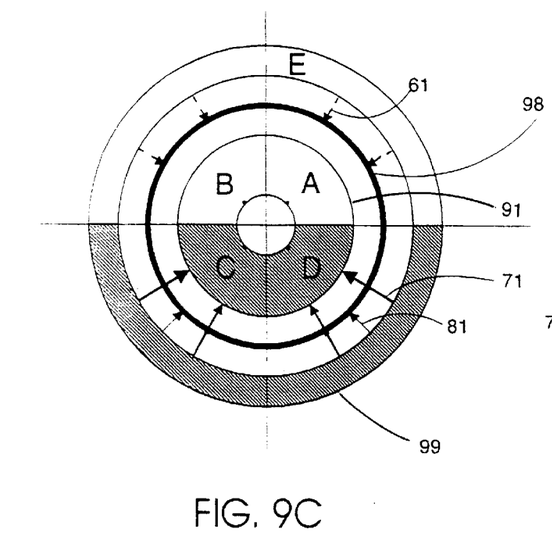
Figure 9D:
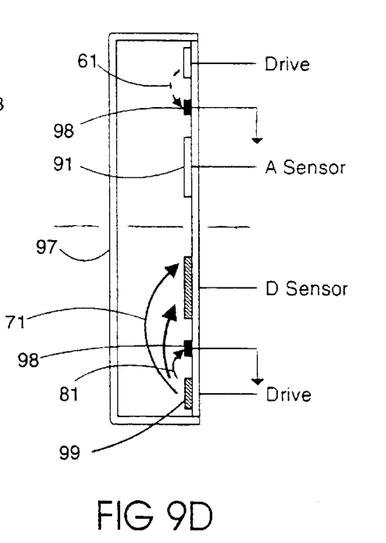

FIG. 9C illustrates the introduction of a guard ring 98 to eliminate this undesirable leakage current between driving ring 99 and sensing plates A, B, C, and D. If the guard ring 98 is connected to analog ground, leakage current 61 is trapped and returned to analog ground and does not to reach sensing plate A and B. As illustrated in FIG. 9C and FIG. 9D submerged set of plates C and D will sense true current.

FIG. 9D shows cross section view of primarily current 71 flowing from the drive ring to sensing plate D. The submerged portion of the guard ring will also receive current 81 from the drive ring. This lost current will reduce the current reaching the main sensing segments, but the remaining current is still symmetrical. Thus, introduction of a guard ring will increase current requirement from the driving ring but it will not affect accuracy.

The novel sensor described in FIG. 9A through FIG. 9D allows the miniaturization of the sensor and allows manufacturing simplicity by requiring only a precise geometrically concentric electrode design on only one side of the sensor unit. The electrode side may be constructed by using epoxy board, ceramic substrates, or metalized conductor on silicon or glass. Although a non-conductive encapsulating enclosure is used for illustration, a conductive metallic could be used as well, providing greater flexibility in design. By using a guard ring and the described calculations, it is possible to reduce or eliminate various problems such as surface meniscus effects, liquid level change due to fill level change, temperature or conductivity variations. Although it will not preclude use of certain form of table look up to make additional correction if needed, however, the devices and methods disclosed allow overcoming most of the constraints without necessitating a look up table correction for each sensor.

While plural embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. An inclinometer comprising:
   a sensor for providing conductive current dependent on the orientation of the inclinometer, wherein said sensor includes;
   a) a sealed enclosure cavity means, partially filled with a conductive liquid,
   b) at least one radial concentric driver electrode placed concentrically within said cavity, and
   c) at least two sensing electrodes segments placed on a non-conductive structure placed concentrically within said cavity; and
   a circuit to sense each segment electrode's current while keeping the voltage on all said sensing electrodes at a substantially same, negligible low voltage.

2. An inclinometer according to claim 1, further comprising a converter to convert sensed current to provide a display of a corresponding angle of the inclinometer.

3. An inclinometer comprising:
   a sensor for providing conductive current dependent on the orientation of the inclinometer, wherein said sensor includes
   a) a sealed enclosure cavity partially filled with a conductive liquid,
   b) at least one radial concentric driver electrode placed concentrically within said cavity, and
   c) at least two sensing electrode segments placed on a nonconductive structure placed concentrically within said cavity;
   a circuit to sense each segment electrode's current while keeping the voltage on all said sensing electrodes at a substantially same, negligible low voltage;
   wherein said sense circuit includes an amplifier means to convert said sense electrode's current to a voltage suitable to drive a converter means.

4. An inclinometer according to claim 3, further comprising a multiplexer to select and read current of one of said sensing electrodes and connecting unselected ones of said sensing electrodes to analog ground to keep the voltage on said sensing electrodes at substantially the same, negligible small voltage.

5. An inclinometer according to claim 4 further comprising:
   an analog to digital converter;
   a microprocessor; and a display, wherein said analog to digital converter is selected from the group consisting of: an analog voltage to digital converter; an analog to frequency converter; and a time interval to digital converter.

6. An inclinometer according to claim 5 wherein:

said microprocessor is programmed to include calculation methods employing variable sectors current in a numerator divided by total current or equivalent to some factor of fully submerged sector current to achieve normalization, thus over coming variation due to initial manufacturing variation and environmental changes in use resulting from conductivity change and temperature.

7. An inclinometer according to claim 6, wherein said microprocessor further employs a calculation method to eliminate liquid level variation, surface current fringe effect caused by meniscus by performing a calculation containing expression of subtracting a value of one side of electrode or electrodes from opposite side electrodes.

8. An inclinometer according to claim 3 further comprising:

- a single sided electrode that comprises at least one driving ring; and
- a sensing electrode, that comprises at least two segments;
- a guard conductive trace ring, concentrically placed between said at least one driving ring and said sensing electrodes to intercept and eliminate surface leakage current for a non-submerged portion of sensor plates.

* * * * *